3,384,549
NUCLEAR REACTOR
Jacques Deliege, Brussels, Claude Gerard, Angleur, and
Pierre Maldague, Brussels, Belgium, assignors to Société
Anglo-Belge Vulcain S.A., Brussels, Belgium, a corporation of Belgium
Filed Aug. 26, 1965, Ser. No. 482,725
Claims priority, application Luxembourg, Aug. 28, 1964,
46,851
4 Claims. (Cl. 176—36)

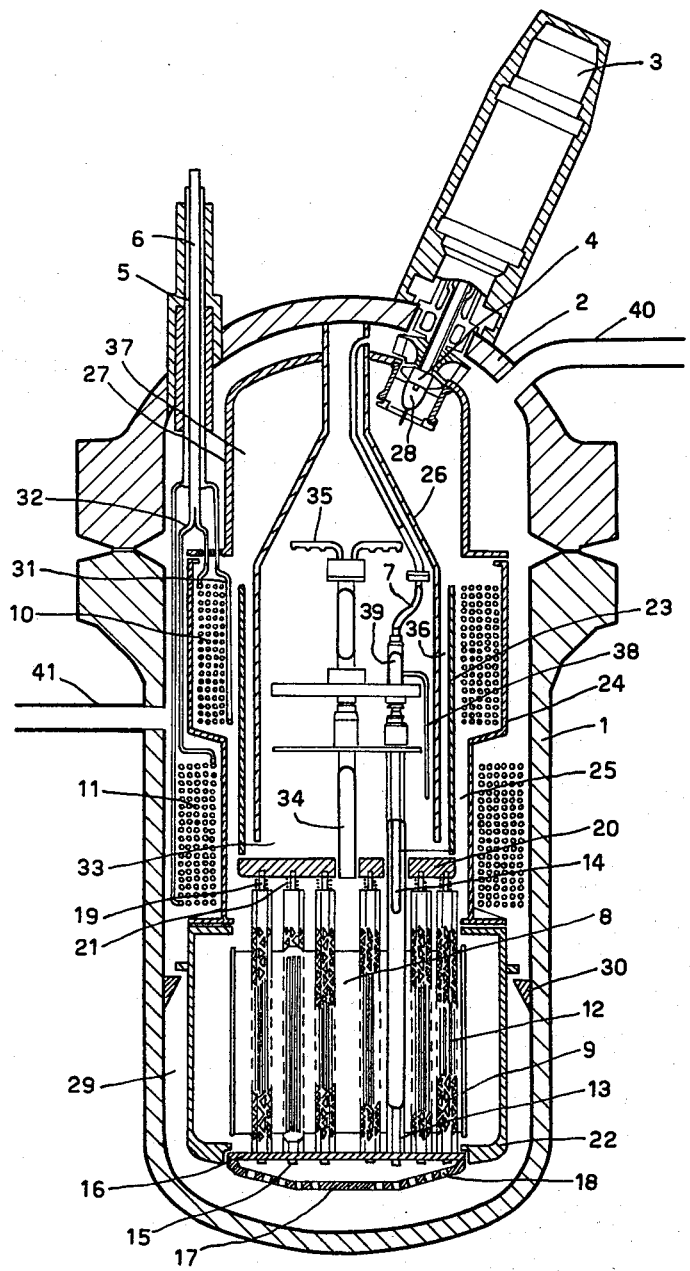

ABSTRACT OF THE DISCLOSURE

The present patent application relates to nuclear reactors having a pressure vessel, comprising a core, heat exchangers and mechanisms for actuating hydraulically driven neutron absorbing members and wherein the heat exchangers are divided in several sections and located in two regions of the pressure vessel; one region upstream of the circulating pumps and the other region downstream of the circulating pumps. The flow of coolant through the heat exchanger regions creates head losses which are used for actuating the neutron absorbing members. These head losses are used also for feeding the atomization device of the pressurizer.

This invention relates to nuclear reactors and more particularly to an arrangement of the various parts and various circuits inside the reactor vessel.

The nuclear reactor according to the invention is characterized by:

(1) Incorporation inside the vessel of the entirety of the main circuit and of the major part of the auxiliary circuits. In addition to the core with the supporting plates and thermal shields, the heat-exchanger, the pressurizer and the mechanisms for the actuation of the absorbing rods are placed inside the pressure vessel. The motors of the pumps ensuring the circulation of the primary fluid are mounted upon the lid of the vessel, whilst the rotors are situated inside the latter.

(2) The heat exchanger may be divided into a certain number of separated sections, each of which may be completely isolated. Each of these sections comprises two regions: the first region situated upstream, and the second situated downstream the circulating pumps for the primary fluid.

Such an arrangement has for its advantages:

(a) to avoid the cavitation in the pumps due to the fact that the primary fluid ensuring the removal of heat from the core is partially cooled in the first part of each section of the exchanger before being sucked up by the pumps.

(b) to ensure at the lower part of the core a value for the pressure of the primary fluid the difference of which relatively to the pressure of this fluid at the section of the pumps is comparable to, but of an opposite direction to that of the difference between the pressure at the lower part of the core and the delivery pressure of the pumps. Such a distribution of the pressure allows to ensure the displacement of the absorbing rods. The absorbing rods are moved inside tubes passing through the core, in the manner of a piston displaced in a cylinder, under the action of the difference of pressure present between the bottom and the top of the rod.

The pressure present at the bottom of the rod is substantially the pressure of the primary fluid at the bottom of the core, whilst the pressure at the top of the rod may be regulated at values comprised between the discharge pressure and the suction pressure of the circulating pumps.

In what is said above, it is understood by "primary fluid," any fluid acting as a coolant and/or moderator and/or reflector and/or fluid of regulation of the reactivity of the reactor.

The drawing shows a nuclear reactor according to the invention.

The vessel 1 is provided with a lid 2 fixed by means of studs. The assembly formed by the vessel and the lid will be called hereinafter a "pressure-enclosure." Upon the lid three pumps one of which has been shown, are flanged and are of the canned rotor and stator type, the shaft of which passes through the lid and carries the rotor 4 at its lower end and the rotor is therefore situated inside the lid.

The shape and dimensions of the lid 2 are determined in such a manner as to satisfy the various specific requirements of the reactor according to the invention. Its surface should be sufficient to allow the presence of the penetrations necessary for:

The passage of the rotors of three pumps, the said penetrations being arranged at 120° from one another;

The passage of the three admissions 5 of the secondary fluid;

The passage of the three outlets 6 of the secondary fluid;

The passage of the conduits 7 actuating the hydraulic mechanisms associated with the absorbing rods;

The penetrations 40 and 41 through the lid 2 and vessel 1 connecting the main circuit with the auxiliary circuits not contained inside the vessel.

The shape and the dimensions of the lid are moreover such that the pumps are entirely situated inside the cylinder of the space circumscribed to the flanges of the vessel and of the lid, these flanges conditioning therefore the space radially occupied by the pressure enclosure. The specific requirements, thus prescribed for the lid, should obviously be satisfied within the limits of a mode of construction acceptable from the point of view of mechanical resistance. In the pressure enclosure a main circuit is seen which comprises the components participating in a direct manner to the production and/or transfer of heat evolved by the reactor. The circuit, through which the primary fluid flows, comprises essentially: a core 8 comprising fuel assemblies 9, tube bundles 10 and 11 forming the heat exchanger, and also three primary pumps 3 working in parallel and ensuring in particular the circulation of primary fluid through the core and the heat exchanger.

The latter is divided into two regions: a first region 10 called "upstream region" is situated between the outlet 8 from the core and the suction of the primary pumps 3, and a second part 11 called "downstream region" is situated between the delivery of the pumps 3 and the inlet to the core 8.

The core 8 is formed of two types of interchangeable assemblies 9 of hexagonal outer section: fuel assemblies comprising the rods 12 containing the nuclear fuel and moderator assemblies 13 formed by tubes of hexagonal outer section and circular inner section, in which the absorbing rods 14 may be moved.

The fuel rods 12 consist of thin tubes of stainless steel or of Zircaloy containing pellets of uranium oxide. The fuel assemblies boxes 9 are preferably made of the same material as the canning of the fuel rods.

The rods are held in these boxes by any known means such as described.

The faces of the boxes 9 are provided with openings having the shape of a triangle which allows a flow of primary fluid between the adjacent boxes.

Each box is extended downwards by a foot 15 penetrating into the corresponding opening provided in the plate 16 called centering plate, simultaneously serving as a support and a centering for the fuel assemblies. The plate 16 rests upon a plate 17; the latter has the shape of a saucer and is provided with holes 18 permitting to control and distribute the flow of primary fluid entering the core. The major part of this flow passes successively through the plates 17 and 16, enters at the lower part of the fuel assemblies and passes through the core.

Each box is extended upwards by a head 19 entering a plate 20, which ensures the centering of the fuel assemblies 9 from above. That head carries a spring 21 the function of which is to exert an axial force between the supporting face of the head of the assembly and the plate 20. The spring is conceived in such a manner that whatever the accelerations susceptible of being transmitted to the assemblies, the latter will remain resting upon the centering plate 16 through the intermediary of their foot 15. The plate 16 is rigidly fastened to the reactor vessel through the intermediary of a shell 22 and a bracket 30.

When leaving the core, the major part of the primary fluid heated by its passage along the fuel rods 12 enters the upstream region 10 of the heat exchanger. That space of substantially annular section at all levels, is limited by a shell 23 and a baffle 24. The baffle 24 comprises several parts of different diameters according to the levels. At its outlet from the core the primary fluid enters in an annular conduit 25 limited by the shell 23 and by the lower part of the baffle 24, then enters the upstream region 10 of the heat exchanger. In order to limit the loss of head associated with the passage of primary fluid into the assembly of tubes of the heat exchanger, the baffle 24 is cone shaped at a level situated below the section 10. At the outlet from the section 10, the primary fluid is brought into the space comprised between the upper part of a bell 26 and an upper baffle 27, and then is sucked up by the pumps 3. The pumps 3 are provided with a non-return valve 28.

The baffle 27 has in particular for its function to separate the part situated at the suction and at the delivery ends of the pumps 3. It is to be noted that in case of shut-down of one or of two pumps, the flow leaving the tubular bundle from the upstream region 10 of the heat exchanger is sucked up by the pumps which are working. The plenum 37 formed between the bell 26 and the baffle 27 acts as an annular header placed between the outlet of the upstream region 10 and the suction of the pumps 3. That arrangement allows of ensuring the working of the reactor during shut-down of one or of two pumps.

The water is delivered by the pumps 3 along the lid 2 towards the downstream region 11 of the heat exchanger. The latter has an annular section at all levels and is limited on the inside by the baffle 24 and on the outside by the inner wall of the vessel 1.

The primary fluid leaves the downstream region 11 of the heat exchanger and enters an annular conduit 29 which is limited on the outside by the vessel 1 of the reactor and on the inside by the wall 22.

In the downstream region 11 as in the upstream region of the heat exchanger, each tube of the tubular bundle has the form of a helix comprising a certain number of turns and the axis of which is that of the reactor. Several helices may have the same diameter of winding so that superposed tubes belong to different coaxial helices.

In order to permit the circulation of the secondary fluid inside the tubes of the heat exchanger, the latter are provided with an inlet segment 31 which collects at the inlet collector 5 the fraction of secondary flow intended for the considered tube of the tubular bundle.

The heated secondary fluid leaves each tube through an outlet segment 32 shorter than the segment 31 and is brought to the outlet collector 6.

The major part of the primary fluid flows in the main circuit. The pressure present at various points of the main circuit is determined substantially by the flow of primary fluid. The differences of pressure from one point to another may serve as motive pressure to produce flows derived of the primary fluid in auxiliary circuits. One of the auxiliary circuits relates to the pressurizer. Part of the primary fluid heated in the core is directed from the outlet of the latter into the pressurizer 33. The pressurizer 33 contains primary fluid at its lower part, and at its upper part it contains a mixture of the vapour of the said fluid and one or several gases, the liquid and vapour phases being separated by a horizontal liquid plane. A flow derived from the primary fluid taken at the outlet of the core is introduced into the pressurizer 33 through a conduit 34 leading to the pulverizing device 35 situated at the upper part of the pressurizer 33. The conduit 34 may be situated in the zones at the outlet, of the core where the primary fluid is at its highest temperature.

The liquid leaving the pressurizer 33 flows through an annular conduit 36 leading to the plenum 37 of the main circuit, where the same pressure prevails as at the suction end of the pumps 3. As the loss of head in the conduit 36 may be substantially negligible, the pressure present in the pressurizer 33 may be substantially equal to that present in the suction end of the pumps. Besides, the auxiliary circuit of the pressurizer is established in parallel with the fraction of the main circuit comprised between the outlet of the core and the suction end of the pumps. The loss of head between the outlet from the core and the suction end of the pumps is comparatively important owing to the flow of fluid through the heat exchanger. The corresponding motive pressure allows a flow of a comparatively important derived fraction of primary fluid through the pulverization device 35.

The shell 23 is made integral with the plate 20, the entire structure being made integral with the core and with the vessel by any known means of fixation. The bell 26 is fixed to the lid 2.

A second auxiliary circuit incorporated inside the reactor vessel is used for actuating the absorbing rods. The starting point of this circuit is situated at the lower part of the moderator tubes 13. The moderator tubes are extended above the core into the space of the pressurizer by a valve 39. The circuit may be extended from the said valve either through the conduit 7 leading to the delivery of the pumps, or through the conduit 38, of small dimensions, leading to the space occupied by the water of pressurizer. When the moderator tube is connected to the conduit 38, the pressure present at the top of the moderator tube is substantially equal to that present inside the pressurizer and consequently lower than that at the inlet of the core. A rising flow of primary fluid will ensue into the moderator tubes. That flow acts upon the absorbing rods 14 of which it causes the rising or the maintaining in a position inserted into the core or removed from the latter. When the moderator tube is connected to the conduit 7, the pressure present at the top of the moderator tube is substantially equal to the delivery pressure of the pumps, that is at the point of the primary enclosure where the pressure is highest.

By means of the valve 39 it is therefore possible to connect the top of the moderator tube 13 with the conduit 7, thus producing a reversal of the flow into the tube 13 and the rapid introduction of the absorbing rods 14 into the core.

What we claim is:
1. In a nuclear reactor comprising:
 (a) a vessel,
 (b) a core and a heat exchanger in said vessel,
 (c) elongated channels extending into said core,
 (d) movable neutron absorbing members mounted in said channels,
 (e) rotors of circulating pumps located in said vessel and causing a primary fluid to flow through said core and heat exchanger,
the improvement which comprises:
 (f) said heat exchanger being subdivided and located in two regions,
 (g) one section of the heat exchanger being located upstream of said rotors of the circulating pumps,

(h) and the other section of the heat exchanger being located downstream of said rotors,
(i) baffle means defining a circuit in said vessel,
(j) the core thereby being situated between the said two regions of the heat exchanger.

2. A nuclear reactor according to claim 1, which includes a pressurizer with atomization means in said vessel, and said pressurizer is situated in parallel with the section of the heat exchanger that is between the core and the suction side of the circulating pumps.

3. In a nuclear reactor comprising:
(a) a vessel,
(b) a core and a heat exchanger in said vessel,
(c) elongated channels extending into said core,
(d) movable neutron absorbing members mounted in said channels,
(e) rotors of circulating pumping located in said vessel and causing a primary fluid to flow through said core and heat exchanger,
the improvement which comprises creating the pressure difference necessary for moving said neutron absorbing members by causing the primary fluid to flow through a circuit in which:
(f) said heat exchanger is subdivided and located in two sections,
(g) one section of the heat exchanger being located upstream of said rotors of the circulating pumps,
(h) and the other section of the heat exchanger being located downstream of said rotors,
(i) baffle means defining a flow circuit in said vessel,
(j) the core thereby being situated between the two regions of the heat exchanger.

4. In a nuclear reactor comprising:
(a) a vessel,
(b) a core and a heat exchanger in said vessel,
(c) a pressurizer with atomization means in said vessel,
(d) elongated channels extending into said core,
(e) movable neutron absorbing members mounted in said channels,
(f) rotors of circulating pumping located in said vessel and causing a primary fluid to flow through said core and heat exchanger,
the improvement which comprises causing a primary fluid to flow through said core and heat exchanger; creating the pressure difference necessary for moving said neutron absorbing members and for feeding the atomization means of said pressurizer by causing the primary fluid to flow through a circuit in which:
(g) said heat exchanger is subdivided in several sections and located in two regions,
(h) one section of the heat exchanger being located upstream of said rotors of the circulating pumps,
(i) and the other section of the heat exchanger being located downstream of said rotors, and baffle means defining a circuit in said vessel,
(j) the core thereby being situated between the two regions of the heat exchanger and in which the pressurizer is situated in parallel with the region of the heat exchanger between the core and the suction side of the pumps.

References Cited

UNITED STATES PATENTS

| | | | |
|---|---|---|---|
| 3,151,034 | 9/1964 | Douglass et al. | 176—53 |
| 3,163,585 | 12/1964 | Metcalfe et al. | 176—65 |
| 3,223,589 | 12/1965 | Ziegler | 176—54 |
| 3,231,473 | 1/1966 | Hennig | 176—36 |
| 3,245,879 | 4/1966 | Purdy et al. | 176—53 |
| 3,255,089 | 6/1966 | Deighton | 176—53 |

FOREIGN PATENTS 1,351,253  12/1963  France.

L. DEWAYNE RUTLEDGE, *Primary Examiner.*